of the Electrochem. Soc., 148 (12), pp. A1362-A1367, 2001.*

(12) United States Patent
Naoi (10) Patent No.: US 7,572,542 B2
(45) Date of Patent: Aug. 11, 2009

(54) NANOCARBON COMPOSITE STRUCTURE HAVING RUTHENIUM OXIDE TRAPPED THEREIN

(75) Inventor: Katsuhiko Naoi, Fuchu (JP)

(73) Assignee: Tokyo University of Agriculture and Technology, National University Corporation, Tokyo (JP)

( * ) Notice: Subject to any disclaimer, the term of this patent is extended or adjusted under 35 U.S.C. 154(b) by 52 days.

(21) Appl. No.: 11/628,853

(22) PCT Filed: Jun. 10, 2005

(86) PCT No.: PCT/JP2005/010717

§ 371 (c)(1),
(2), (4) Date: Dec. 7, 2006

(87) PCT Pub. No.: WO2005/121022

PCT Pub. Date: Dec. 22, 2005

(65) Prior Publication Data

US 2008/0048153 A1 Feb. 28, 2008

(30) Foreign Application Priority Data

Jun. 11, 2004 (JP) ............................. 2004-173452

(51) Int. Cl.
*H01B 1/06* (2006.01)
(52) U.S. Cl. ........................ 429/42; 252/500; 252/506; 252/510; 252/502; 429/215; 429/217; 977/755; 977/811
(58) Field of Classification Search ................. 252/500, 252/2, 506; 429/42, 215, 217; 977/755, 977/811
See application file for complete search history.

(56) References Cited

U.S. PATENT DOCUMENTS 5,961,887 A * 10/1999 Zheng et al. ................. 252/502
2002/0122985 A1* 9/2002 Sato et al. .................... 429/232

FOREIGN PATENT DOCUMENTS

EP 1225647 7/2002
JP 2000-36441 2/2000

OTHER PUBLICATIONS

Zhang et al. "Preparation and electromchemistry of hydrous ruthenium oxide/active carbon electrode materials for supercapacitor." J. of the Electrochem. Soc., 148 (12), pp. A1362-A1367, 2001.*

(Continued)

*Primary Examiner*—Mark Kopec
*Assistant Examiner*—Tri V Nguyen
(74) *Attorney, Agent, or Firm*—Dilworth & Barrese LLP (57) ABSTRACT

A novel nanocarbon composite structure is provided having trapped ruthenium oxide. By using Ketjen black, and through chemical-mechanical effect utilizing an ultracentrifugal reaction field, both the specific surface area of ruthenium oxide and space of electrode material are expanded to have nanoparticles of ruthenium oxide highly dispersed in a graphene layer. This nanocarbon composite structure having trapped ruthenium oxide exhibits high electrochemical activity and is suitable for use as an electrical energy storing device, such as a large-capacity capacitor.

6 Claims, 5 Drawing Sheets

OTHER PUBLICATIONS

Qin et al. "Electrochemical characterization on RuO2.xH2O/carbon nanotubes composite electrodes for high energy density supercapacitors." Carbon, vol. 42 (2), pp. 451-453, Nov. 2003.*

Hu et al. "How to achieve maximum utilization of hydrous ruthenium oxide for supercapacitors." J. of the Electrochem. Soc., 151, A281-290, Jan. 9, 2004.*

Machida et al "Preparation and Electrochemistry of Nano-composites Based on Metal Oxides and π-stacked Supermolecules," the Electrochemical Society of Japan Taikai Koen Yoshisu, Mar. 25, 2002, vol. 69, pp. 133.

Zheng et al. "Hydrous Ruthenium Oxide as an Electrode Material for Electrochemical Capacitors," J. Electrochem Soc., 142 (8), Aug. 1995, pp. 2699-2703.

Furuuchi et al., "Preparation and Electrochemical Study of Nanocomposite Based on Ruthenium Oxide and Conducting Polymer," The Chemical Society of Japan, 83rd Annual Spring Conference Proceedings (2003), p. 74.

Panic V et al, "The properties of carbon-supported hydrous ruthenium oxide obtained from RuOxHy sol" Electrochemica Acta, Elsevier Science Publishers, Barking, GB, vol. 48, No. 25-26, Nov. 15, 2003, pp. 3805-3813.

Kim H et al, "Characterization of hydrous ruthenium oxide/carbon nanocomposite supercapacitors prepared by a colloidal method" Journal of Power Sources, Elsevier, Amsterdam, NL, vol. 104, No. 1, Jan. 15, 2002, pp. 52-61.

Miller J M et al, "Morphology and Electrochemistry of Ruthenium/Carbon Aerogel Nanostructures" Langmuir, American Chemical Society, New York, NY, US, vol. 15, No. 4, 1999, pp. 799-806.

* cited by examiner

FIG. 1

Step1

Step2

Step3

Step4

NANOCARBON COMPOSITE STRUCTURE HAVING RUTHENIUM OXIDE TRAPPED THEREIN

TECHNICAL FIELD

The present invention relates to novel ruthenium oxide encapsulating carbon nanocomposites, in particular, to highly electrochemically active (high capacitance) ruthenium oxide nanodots that are encapsulated into hollow structured carbon nanomaterial. These will be utilized appropriately for power storage elements in electric vehicle capacitors or power systems, power storage elements used in combination with power fuel cells or solar batteries, and electric energy storage elements such as capacitors suitable for use in emergency power sources or backup powers.

BACKGROUND ART

Hydrous ruthenium oxide has been attracting attention as an electrode material for the next generation supercapacitors, and there exist a number of reports thereof. For instance, T. R. Jow et al. reported a large capacity (600 to 700 F/g) by nanosizing the hydrous ruthenium oxide particles (diameter: 100 nm) by a sol-gel process (see Non-Patent Document 1).

In addition, Naoi et al. reported that a nano-composite of core-shell type, prepared by coating a proton-conductive polymer on hydrous ruthenium oxide particles, makes high-rate charge and discharge possible, so as to solve a problem that proton diffusion is slow across electrodes of hydrous ruthenium oxide (see Non-Patent Document 2). However, these previous proposals do not sufficiently lead to electrode materials of next generation supercapacitors, thus there are needs for still higher capacity of electrode materials.

On the other hand, it is reported that a sheet electrode, containing highly-dispersed hydrous ruthenium oxide that are supported onto a large surface area carbon, and are dried at a lower temperature under nitrogen gas flow, exhibits a higher capacitance per ruthenium weight and a larger power density per sheet-electrode weight (see Patent Document 1). However, the hydrous ruthenium oxide is likely to dissolve into aqueous electrolytes during the charge and discharge cycles. Furthermore, the documentation describes the capacitance value per weight of ruthenium, but does not describe the capacitance per weight of the material i.e. powder that carries the hydrous ruthenium oxide. However, from the fact that the content of the ruthenium is as low as 3.82% by weight, it is estimated that the capacitance is remarkably lower per weight of the material and far from practical use.

Patent Document 1: Japanese Unexamined Patent Application Publication No. 2000-36441

Non-Patent Document 1: J. Electrochemical. Soc., 142, 2699 (1995)

Non-Patent Document 2: The Chemical Society of Japan, 83rd Annual Spring Conference Proceedings p. 74 (2003)

DISCLOSURE OF THE INVENTION

Problems to be Solved by the Invention

The present invention is made in view of the actual circumstances described above, and aims to provide a ruthenium oxide encapsulating nano-carbon composite structure that shows remarkably high capacitance and therefore suitable for use in electric energy storage elements such as large capacity capacitors.

Means for Solving Problem

The present inventors have investigated vigorously and found that both the specific surface area of the ruthenium oxide and the space of electrode material can be enlarged by forming a composition of ruthenium oxide and a certain carbon material. Consequently, it was found that improvement of charge utilization can be accomplished by making the composition into a nano-size; as a result, the present invention has been completed.

The present invention has been attained on the basis of the discoveries described above, and the subject matter is to provide a ruthenium oxide encapsulating nano-carbon composite structure that is characterized in that ruthenium oxide nano-particles are highly dispersed inside graphene layers (carbon layers) of hollow nano-carbon having a porosity of no less than 30% by volume.

EFFECT OF THE INVENTION

The ruthenium oxide nanodots encapsulated nano-carbon composite structure according to the present invention can bring about electrochemical supercapacitors with higher capacitance in such applications of materials as power storage elements in electric vehicle capacitors or power systems, power storage elements combined with power fuel cells or solar batteries, and electric energy storage elements including capacitors for emergency power sources or backup powers by virtue of its higher electrochemical activity.

PREFERRED MODE FOR CARRYING OUT THE INVENTION

The present invention will be explained in detail below.

The ruthenium oxide encapsulating nano-carbon composite structure according to the present invention has such a configuration that ruthenium oxide nano-particles are highly dispersed inside and outside of graphene layers (carbon layers) of hollow nano-carbon having a porosity of no less than 30% by volume.

Hydration Number of Ruthenium Oxide

It is preferred in the ruthenium oxide encapsulating nano-carbon composite structure according to the present invention that the ruthenium oxide nano-particles are of hydrous ruthenium oxide. The hydration number of the hydrous ruthenium oxide is not limited, but usually is in a range of 0.3 to 2.0, preferably 0.5 to 0.9. When the hydration number of the hydrous ruthenium oxide is less than 0.3, the expression rate of the specific capacitance becomes significantly low.

Nano-Particle Size of Ruthenium Oxide

The ruthenium oxide nano-particle size is usually no more than 10 nm, preferably 0.1 nm to 10 nm, especially preferably 0.5 nm to 5 nm. When it is above 10 nm, charge availability is lower in electrodes being produced therefrom. On the other hand, it is difficult to produce nano-particles of less than 0.1 nm.

Porosity of Hollow Nano-Carbon

The porosity, i.e. inner volume of fine pores per unit volume, of the hollow nano-carbon used in the present invention is usually no less than 30% by volume, preferably 50% by volume to 90% by volume. Electrically conductive carbon blacks with higher porosities, e.g. commercially available Ketjen blacks, can be used to prepare such a hollow nano-carbon.

The electrically conductive carbon blacks, being constructed from crystallites called "pseudo-graphite structure", exist as secondary particles of structures or agglomerates formed of fused primary particles each being formed of aggregated crystallites.

The Ketjen blacks have significantly higher porosities compared to other electrically conductive carbon blacks. For example, the porosities of acetylene blacks are about 22 volume %, whereas there exist hollow Ketjen blacks having porosities as high as above 50%. There are two kinds of commercially available Ketjen blacks of which the porosities are about 60% by volume and about 78% by volume respectively; these can be favorably used.

Particle Size of Ruthenium Oxide Encapsulating Nano-Carbon Composite Structure

The ruthenium oxide encapsulating nano-carbon composite structure according to the present invention is characterized in that ruthenium oxide nano-particles are highly dispersed inside graphene layers of nano-carbon that is formed of the secondary particle of fused hollow primary particles. The porosity of the ruthenium oxide encapsulating nano-carbon composite structure is no less than 30% by volume; the particle size of the secondary particles that construct the ruthenium oxide encapsulating nano-carbon composite structure is usually no more than 300 nm, preferably 100 nm to 300 nm. When the particle size of the secondary particles that construct the ruthenium oxide encapsulating nano-carbon composite structure is within this range, an optimal specific capacitance can be developed.

Content of Ruthenium Oxide

In the ruthenium oxide encapsulating nano-carbon composite structure according to the present invention, the content of the ruthenium oxide is usually 5% by mass to 95% by mass, preferably 7.8% by mass to 75% by mass based on total mass of the composite structure. The content of the ruthenium oxide depends on actual applications in relation to energy density required for electrochemical capacitors and their costs. For example, it is predicted to be approximately 5 to 50% by mass for the applications where moderate energy densities are required and lower costs are necessary to produce the devices (e.g. application for automobiles etc.), on the other to be approximately 50 to 95% by mass for the applications where higher energy densities are required and the costs are not so restricted (e.g. memory backup of cellular phones).

Method for Producing Ruthenium Oxide Encapsulating Nano-Carbon Composite Structure The method for producing the ruthenium oxide encapsulating nano-carbon composite structure of the present invention will be explained in the following, but the present invention should not be limited thereto in particular.

The method for producing the ruthenium oxide encapsulating nano-carbon composite structure of the present invention comprises a process of preparing a precursor, a process of forming ruthenium oxide and a process of reaggregating hollow nano-carbon.

Process of Preparing Precursor

In the process of preparing a precursor, electrically conductive hollow nano-carbon having a hollow structure with a porosity of no less than 30% by volume, preferably no less than 50% by volume is highly dispersed in water, thereafter ruthenium chloride aqueous solution is added thereby to prepare a precursor in a condition that the ruthenium chloride is absorbed onto the outer surface of the hollow nano-carbon.

Process of Forming Ruthenium Oxide

In the process of forming ruthenium oxide, an effectual shear stress is imparted to the precursor obtained from the process of preparing a precursor described above, thereby the carbon graphene that constitutes the hollow nano-carbon is partially broken up and the aggregated secondary particles of the hollow nano-carbon are milled; and a sol-gel reaction is allowed to proceed by adding an aqueous sodium hydroxide solution while partially fracturing and opening the primary particles, thereby forming the ruthenium oxide nano-particles. The shear stress disengages the agglomerates of hollow nano-carbon to decrease the secondary particle size as well as to highly disperse the ruthenium chloride that constitutes the precursor. Furthermore, the fracturing and opening of the graphene layers of the hollow nano-carbon primary particles as well as the progress of the sol-gel reaction allow to yield ruthenium oxide primary particles with a few nanometers and to highly disperse them inside and outside of the graphene layers of the hollow nano-carbon.

The method for applying the shear stress in the process of forming the ruthenium oxide is not particularly limited in any way; the method for milling the aggregated secondary particles of the hollow nano-carbon while partially fracturing and opening the primary particles as well as allowing to proceed the sol-gel reaction thereby affecting conveniently a mechanochemical effect is exemplified, for example, by generating a centrifugal force so as to make use of the shear stress at the vessel wall.

Preferably, the energy for generating the stress in this process is from 0.5 MPa to 2 MPa, specifically, a centrifugal force process (centrifugal processing) at 20,000 G to 75,000 G is exemplified. This process can bring about a composite structure in which ruthenium oxide is super-highly dispersed as nanodots at both the surface and the inside of the graphene layer of the hollow nano-carbon. The period for the centrifugal processing depends on the intensity of centrifugal reaction field; usually the period is from 3 minutes to about 20 minutes.

In the process of forming ruthenium oxide, the resulting ruthenium oxide is subjected to the shear stress during the growth stage of nano-particles. Accordingly, even when the particles have grown to a certain size, the particles will be milled by the shear stress, thus the particles of the resulting ruthenium oxide are micronized. The micronized particles are supported on the inside wall of carbon, and will not grow any bigger. The ruthenium oxide is nano-micronized by such a mechanism, and nano-particles as small as 0.5 to 2 nm can be obtained.

Process for Reaggregating Hollow Nano-Carbon

Finally, the shear stress is discontinued, thereby the fractured graphene layers are arranged again. Here, the fractured and opened hollow nano-particles reaggregate along with encapsulating the ruthenium oxide primary particles, consequently secondary particles are formed with a lowered average particle size and a sharp particle size distribution, and a composite structure with ruthenium oxide highly dispersed inside the graphene layer of the hollow nano-carbon can be formed.

The resulting ruthenium oxide encapsulating nano-carbon composite structure is usually used as a powder after being filtered and dried.

Figure 1:
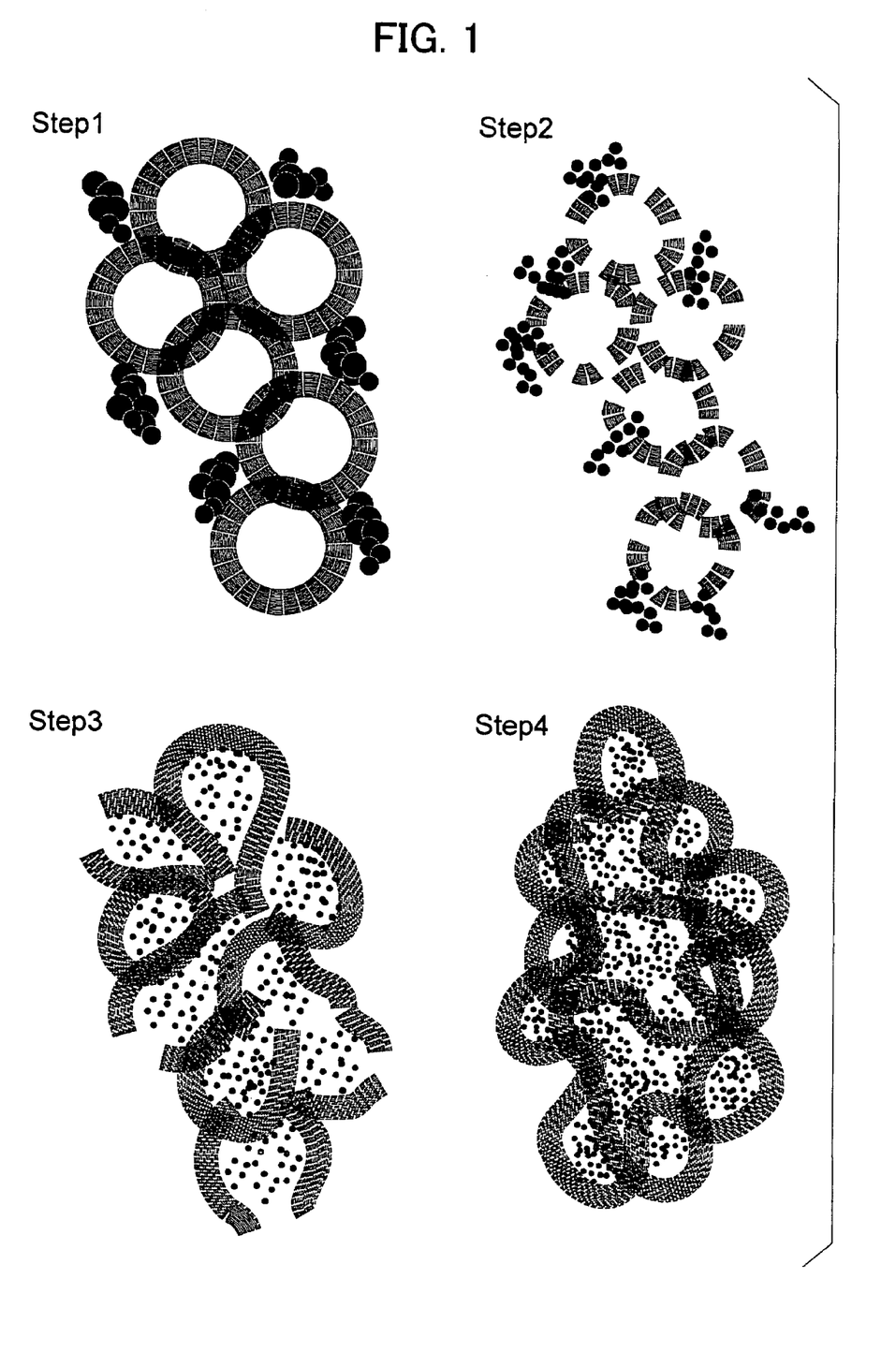
FIG. 1 is a schematic view showing a mechanism for forming the composite structure according to the present invention.

Specific Example of Method for Producing Ruthenium Oxide Encapsulating Nano-Carbon Composite Structure FIG. 1 schematically shows, as a specific example, the mechanism in which centrifugal processing is employed in the method for applying shear stress in the process for producing the composite structure of the present invention. In the Step 1, the agglomerates of hollow nano-carbon are loosened to reduce the secondary particle size; at the same time, the precursor, ruthenium chloride $RuCl_3$, undergoes high dispersion. Then the graphene layers of the hollow nano-carbon primary particles are fractured along with ruthenium chloride $RuCl_3$ being changed into ruthenium oxide $RuO_2.nH_2O$ (Step 2). The formation of ruthenium oxide $RuO_2.nH_2O$ occurs outside and inside of the fractured graphene layers. In addition, the discontinuation of the centrifugal processing in Step 3 leads to the rearrangement of the fractured graphene layer to recover the hollow structure. On this occasion, ruthenium oxide $RuO_2.nH_2O$ nanodots are incorporated inside the graphene layers of the hollow nano-carbon, since the ruthenium oxide $RuO_2.nH_2O$ is less likely to adhere to the basal surface of the outside the graphene layers. In such a way, the hollow nano-carbon that encapsulates the ruthenium oxide $RuO_2.nH_2O$ nanodots is obtained in Step 4.

Specific Capacitance of Ruthenium Oxide Encapsulating Nano-Carbon Composite Structure The specific capacitance of the ruthenium oxide encapsulating nano-carbon composite structure, which depending on the ratio of the ruthenium chloride to the carbon black for the raw materials and the intensity of centrifugal reaction field in the process of fracturing and opening the nano-carbon, is usually no less than 400 F/g based on the weight of the ruthenium oxide encapsulating nano-carbon composite structure in accordance with a three-electrode type measurement method; preferably, those having a specific capacitance of 500 F/g to 600 F/g can be obtained.

Application of Ruthenium Oxide Encapsulating Nano-Carbon Composite Structure

The ruthenium oxide encapsulating nano-carbon composite structure according to the present invention can be used as an electrode material without modification, for example, by dispersing it into a solvent such as water, alcohol and N-methyl pyrrolidine to prepare a slurry, then coating it on an aluminum sheet, titanium sheet, carbon sheet etc., thereby to produce an electrode.

In cases where the ruthenium oxide encapsulating nano-carbon composite structure according to the present invention is used as an electrode material to prepare an electrode by conventional methods, and afterwards to construct an electrochemical capacitor, the capacitor can have a specific capacitance as high as 400 F/g to 600 F/g in an aqueous electrolyte and/or non-aqueous electrolyte, which is several times higher than that of conventional electric double-layer capacitors.

The available electrolyte is, for example, exemplified by aqueous solutions containing 3 to 30 weight % of sulfuric acid, aqueous solutions containing 3 to 30 weight % of sodium hydroxide or potassium hydroxide, and preferably propylene carbonate containing 15 to 30 weight % of tetra ethyl ammonium tetra borate or tetra methyl ammonium tetra fluoro borate.

EXAMPLES

The present invention will be explained in more detail with reference to examples as follows, but the present invention should not be limited to the examples as long as not exceeding its spirit. For example, hydrous ruthenium oxide is exemplified here, but ruthenium oxide is also available.

Dispersion of Hollow Nano-Carbon

Initially, water and 0.35 g of Ketjen black (produced by Ketjen Black International Co., trade name: Ketjen Black EC600JD, porosity of 78% by volume, primary particle size of 40 nm, and an average secondary particle size of 337.8 nm) were poured into an centrifugal device, then the mixture was centrifuged at 75,000 G for 5 minutes to highly disperse the nano-carbon in water. The value of the centrifugal force was calculated using the following formula:

$$G=11.18\times(N/1000)2\times R$$

In the above formula, N is the rotation number (rpm) and R is the radius (cm) of the rotor.

Table 1 shows the average particle size (average particle size of secondary particles) and the particle size distribution of the used Ketjen black and the Ketjen black after centrifugal processing. The average particle size (average particle size of secondary particles) and the particle size distribution were measured by the laser light scattering meter ELS-8000 (produced by Otsuka Electronics Co.). Based on the fact that the range of the particle size distribution was narrowed and the average particle size (average particle size of secondary particle) was decreased after the centrifugal processing, it is believed that the Ketjen black was in a highly dispersed condition due to the centrifugal processing.

TABLE 1

|  | Ketjen Black (as received) | Ketjen Black (after centrifugal processing) |
| --- | --- | --- |
| Average Particle Size of Secondary Particles (nm) | 337.8 | 260.1 |
| Particle Size Distribution (nm) | 100 to 1600 | 50 to 650 |

Example 1

The above-described hollow nano-carbon (Ketjen black, produced by Ketjen Black International Co., trade name: Ketjen Black EC600JD, porosity of 78% by volume, primary particle size of 40 nm, and an average secondary particle size of 337.8 nm) was highly dispersed within the centrifugal device, to which 10 mM of aqueous ruthenium chloride solution was added and then highly dispersed successively to prepare a precursor, in which the ruthenium chloride was absorbed inside and outside of the hollow nano-carbon. To this, 30 mM of aqueous sodium hydroxide solution was added to adjust the pH to 7, and the mixture was centrifuged at a centrifugal force of 75,000 G for 10 minutes to progress a surface sol-gel reaction, thereby to obtain a ruthenium oxide encapsulating nano-carbon composite structure.

Figure 2:
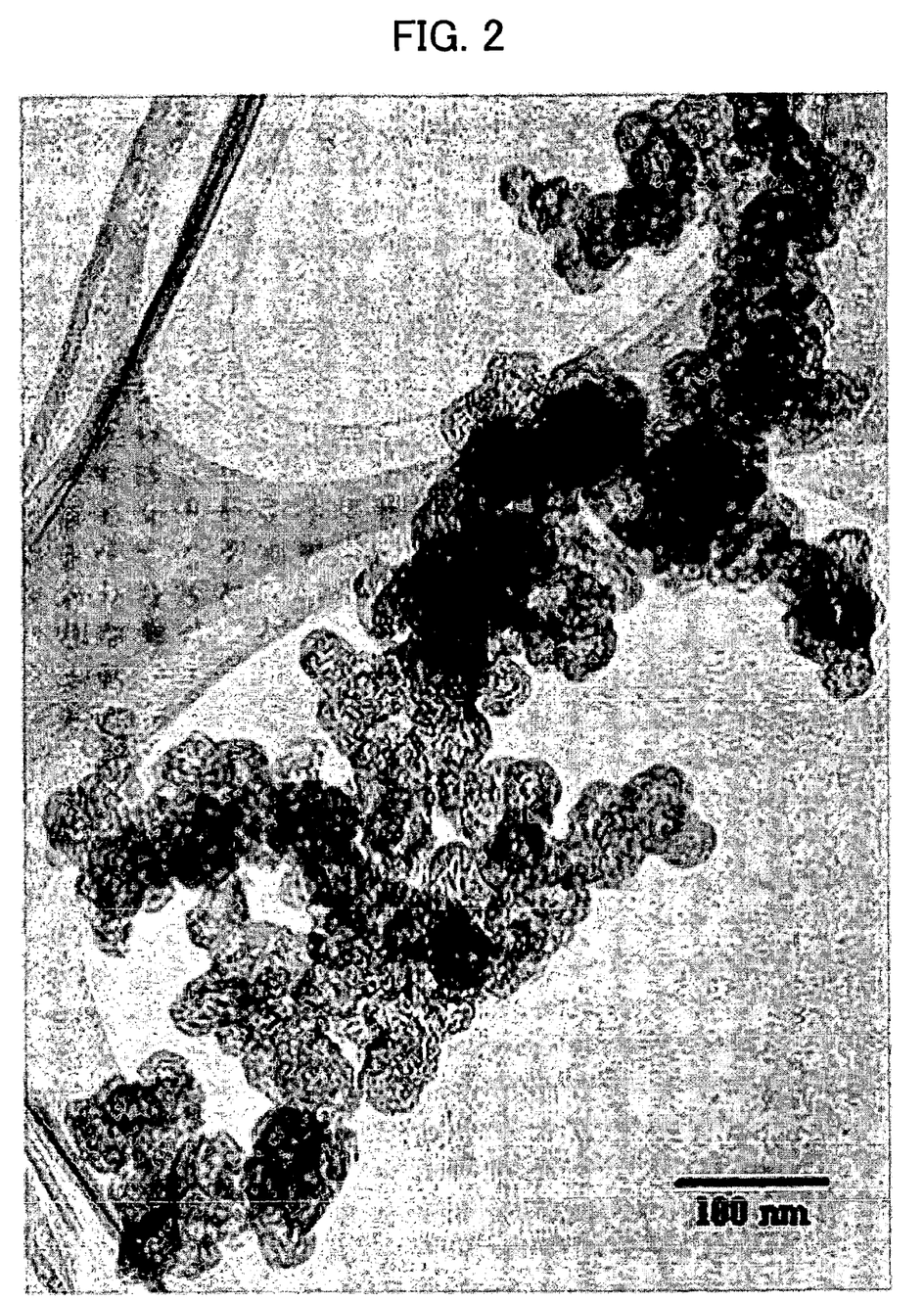
FIG. 2 is a TEM image showing the sample A obtained in Example 1.
Figure 3:
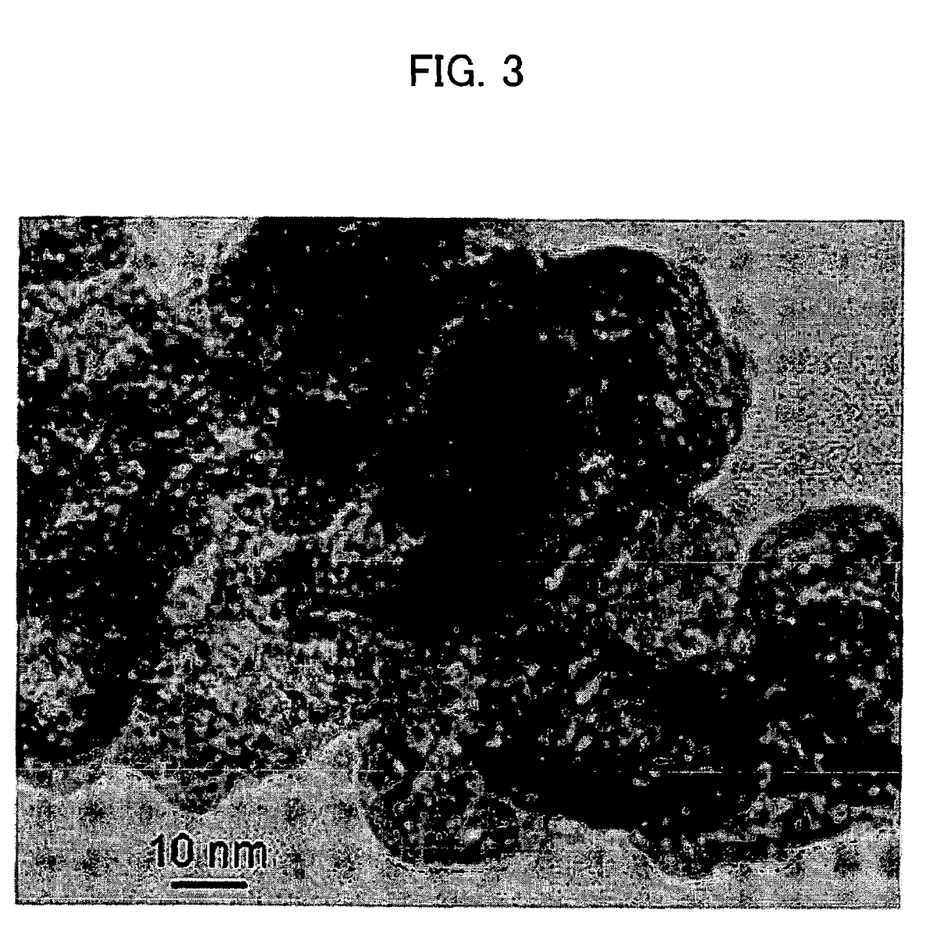
FIG. 3 is partially enlarged TEM image of that described above.

The resulting ruthenium oxide encapsulated carbon nano-composite structure was filtered using an aspirator, a filtering flask and a filter holder, and dried at 100° C. for 6 hours, thereby to prepare a powder of ruthenium oxide encapsulated carbon nano-composite structure in which nano-particles of 0.5 hydrated ruthenium oxide were highly dispersed within the graphene layers inside and outside of the hollow nano-carbon (Sample A). FIGS. 2 and 3 are TEM images of Sample A.

From FIGS. 2 and 3, it is observed that a hollow nano-carbon having primary particle sizes of 30 to 40 nm displays a beaded network called structure and forms secondary particles of 300 to 500 nm. The network is believed to perform as an electron path. In addition, the hollow nano-carbon represents distorted shapes rather than a spherical shape, which is caused by the fact that the graphene layers, forming the primary particles of the hollow nano-carbon, have been fractured once and rearranged. Furthermore, it can be confirmed that ruthenium oxide nano-particles of 0.5 to 2 nm in diameters exist inside the primary particles of the hollow nano-carbon in a mono-dispersed condition.

Example 2

Figure 4:
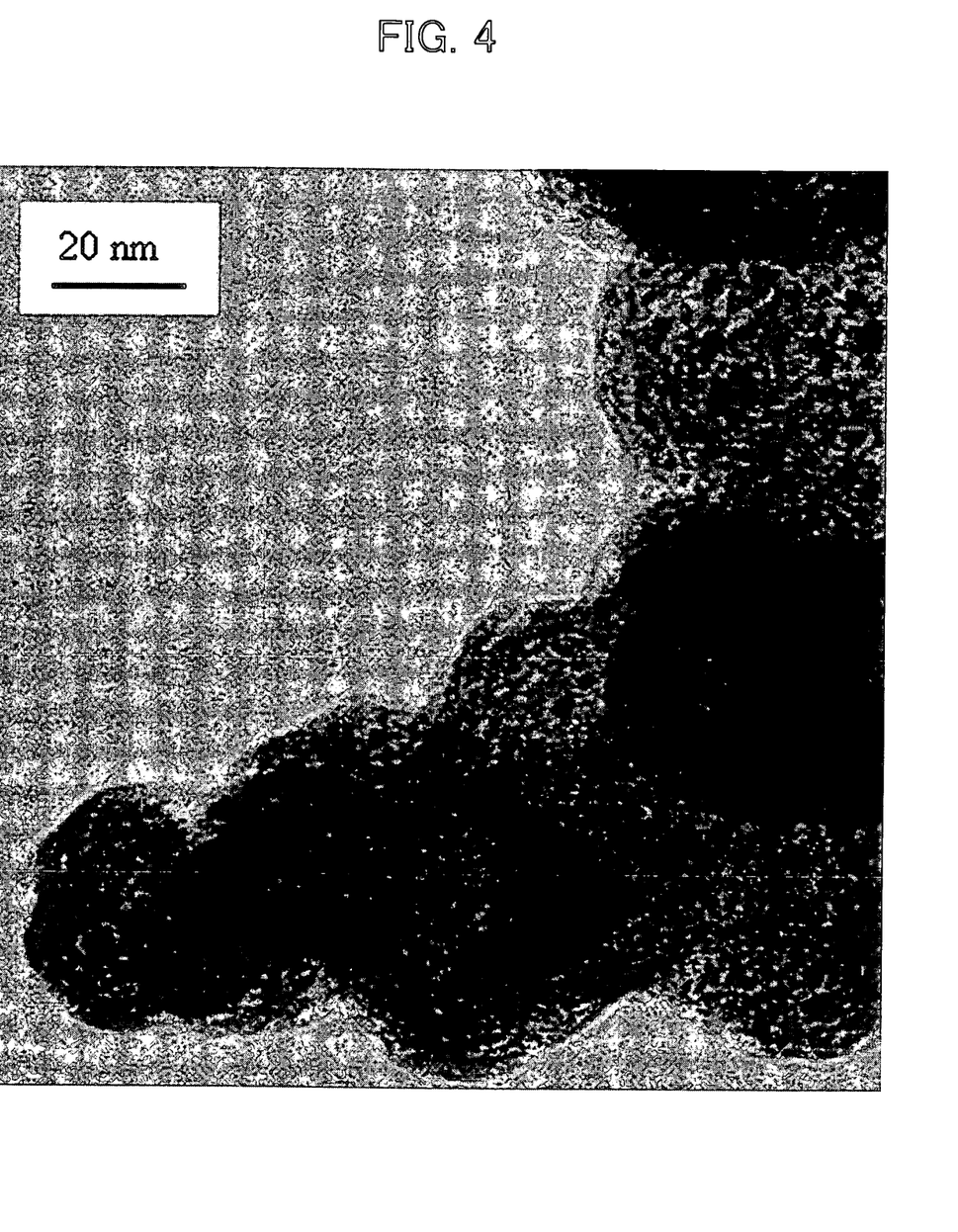
FIG. 4 is a TEM image of sample B obtained in Example 2.

A powder of ruthenium oxide encapsulating nano-carbon composite structure was prepared in a similar manner as Example 1, except that the centrifugal processing period was 20 minutes in the surface sol-gel reaction (Sample B). FIG. 4 shows a TEM image of Sample B.

From FIG. 4, it is found that a hollow nano-carbon having a primary particle size of about 20 nm forms agglomerates, and the secondary particle size is about 200 to 300 nm. It can also be understood that the ruthenium oxide nanodots (average diameter of 1 nm), incorporated into the hollow nano-carbon, agglomerate more significantly than those of Sample A and represent distorted shapes due to the fact that the graphene layer, forming the primary particles of the hollow nano-carbon, has been fractured once and rearranged.

Measurement and Evaluation

The resulting samples in Example 1 (Sample A) and Example 2 (Sample B) were measured with respect to the average particle size of the primary particles, the average particle size of the ruthenium oxide particles, and the specific capacitance by way of three-electrode measurement method on a weight basis. The average particle size of the primary particles and the average particle size of the ruthenium oxide particles were measured by a laser light scattering meter ELS-8000 (produced by Otsuka Electronics Co.). The measurement of the specific capacitance of powders was carried out in such a way that a powder was mixed with water, or 1-methylpyrrolidone, acetonitrile, propylene carbonate or the like to prepare a slurry, and the slurry was coated on a matrix of current collector such as of carbon, aluminum, nickel and copper and dried to prepare positive and negative electrodes of coin cells afterwards to perform charge-discharge tests or cyclic voltammetry. The results are shown in Table 2.

TABLE 2

|  | Example 1 (Sample A) | Example 2 (Sample B) |
| --- | --- | --- |
| Average Particle Size of Primary Particles (nm) | 30 | 20 |
| Average Particle Size of Rhutenium Oxide Particles (nm) | 1 | 1 |
| Specific Capacitance (F/g) | 420 | 600 |

Measurement of Cyclic Voltammogram

The ruthenium oxide encapsulating nano-carbon composite structure obtained in Example 1 (Sample A) was dispersed in water to prepare a slurry, which was coated and dried on a flat surface of a carbon electrode to produce an electrode for a capacitor test. The resulting electrode was used for a working electrode, an Ag/AgCl electrode was used for a reference electrode, then a cyclic voltammogram was measured by a three-electrode method. A solution of 30% by weight sulfuric acid was used for an electrolyte. The results are shown in FIG. 5.

Figure 5:
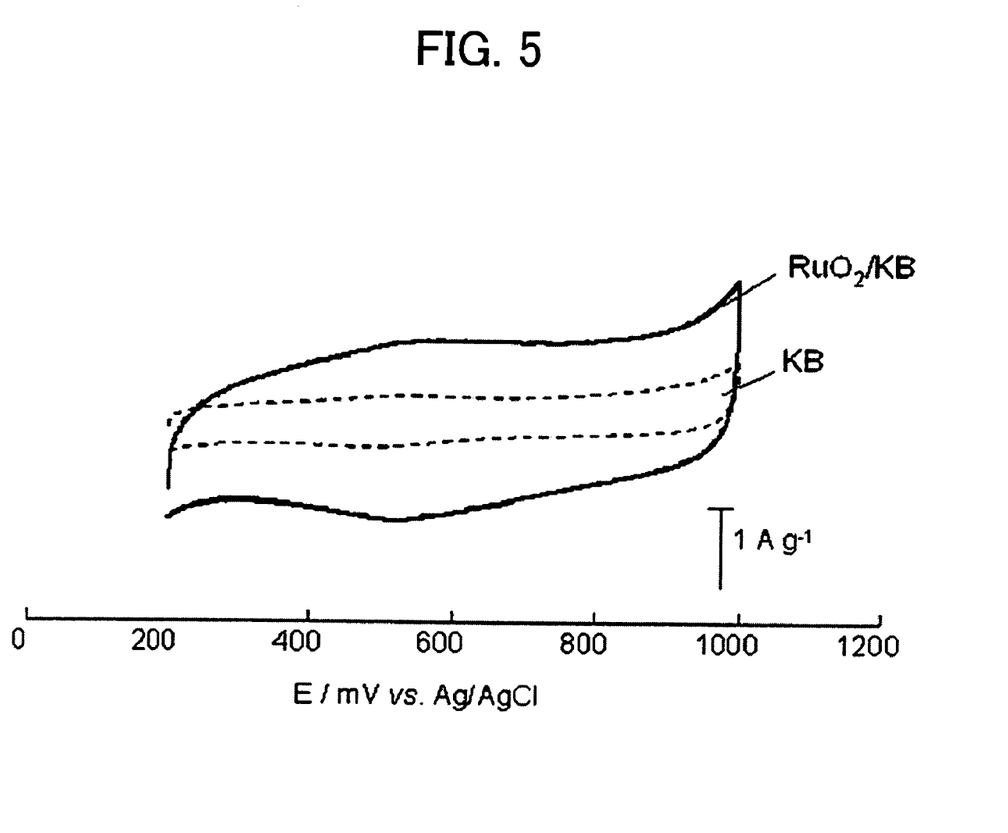
FIG. 5 is a view that shows a cyclic voltammogram obtained in an applied evaluation example.

It is understood from FIG. 5 that the electrode for capacitor test formed of the ruthenium oxide encapsulating nano-carbon composite structure of the present invention represents larger specific capacitances such as 400 to 600 F/g, based on the weight of the composite and 1060 to 1200 F/g, based on the weight of ruthenium oxide. In addition, little loss in capacitance appears under higher rates of charge and discharge (5% to 10% of the loss occurs when the rate is increased from 2 mV/s to 100 mV/s). Little decrease in the capacitance also appears under cycles of charge and discharge (capacitance decrease after 100,000 cycles: 5%). In addition, similar results were obtained from similar measurements using a propylene carbonate electrolyte dissolving 15 to 30% by weight of tetra ethyl ammonium tetra fluoro borate.

From the results described above, the energy density and the powder density as capacitors were calculated. The energy density was calculated from the following equation:

$$E = 0.5 \times V2 \times C/4$$

in which C=420 F/g and operating voltage V=0.8 volt were substituted. As a result, the energy density was calculated to be 33.6 Wh/kg. In addition, the powder density expressed by P=E/s (s: period necessary for one discharge) came to 300 F/g when s=4 seconds, which leads to E=24 Wh/kg, and consequently, the result of the calculation comes to 21600 W/kg.

Comparing these values with those of conventional capacitors of electric double layers, the energy density is 2 to 3 times larger, and the power density is 10 to 15 times larger. Furthermore, when compared with the energy density of 16.9 Wh/kg and the power density of 3244 W/kg of the capacitor based on ruthenium hydroxide described in Patent Document 1, the energy density is about 2 times larger and the power density is about 7 times larger. Accordingly, it is believed that high quality capacitors can be produced using the ruthenium oxide encapsulating nano-carbon composite structure of the present invention as the electrode material, and a large merit and impact will be induced from such practical use.

Example 3

A powder of ruthenium oxide encapsulating nano-carbon composite structure was prepared in a similar manner as Example 1, except that the centrifugal processing was carried out at 45,000 G for 10 minutes (Sample C). The resulting sample C was evaluated in a similar manner as Samples A and B. Consequently, the average secondary particle size was 380 nm, average particle size of the primary particles was 30 nm, and the average particle size of ruthenium oxide particles was 10 nm. The specific capacitance was 300 F/g.

Comparative Example 1

A powder of ruthenium oxide encapsulating nano-carbon composite structure was prepared in a similar manner as Example 1, except that no centrifugal processing was carried out. The resulting powder was evaluated in a similar manner as Samples A and B.

Comparative Example 2

A carbon powder supporting ruthenium oxide was prepared in a similar manner as Example 1 except that a hollow carbon powder of granular acetylene black produced by Denki Kagaku Kogyo K.K. (porosity of 22% by volume, primary particle size of 35 nm, average secondary particle size of 360 nm) was used. The resulting powder was evaluated in a similar manner as Samples A and B. The results of evaluation for Comparative Examples 1 and 2 are shown in Table 3 in comparison with those of Example 1 (Sample A).

TABLE 3

|  | Comparative Example 1 | Comparative Example 2 | Example 1 (Sample A) |
|---|---|---|---|
| Average Particle Size of Secondary Particles (nm) | 360 | 398 | 260 |
| Average Particle Size of Primary Particles (nm) | 40 | 50 | 30 |
| Particle Size of Rhutenium Oxide Particles (nm) | 10 to 70 | 10 to 100 | 0.5 to 2 |
| Specific Capacitance (F/g) |  |  |  |
| per weight of powder | 300 | 360 | 420 |
| per weight of ruthenium oxide hydrate | 700 | 720 | 1060 |
| per weight of ruthenium | 980 | 1010 | 1490 |

INDUSTRIAL APPLICABILITY

The ruthenium oxide encapsulating nano-carbon composite structure obtained from the present invention is adequate for power storage elements in electric vehicle capacitors or power systems, power storage elements combined with power fuel cells or solar batteries, and electric energy storage elements including capacitors for emergency power sources or backup powers, and is significantly valuable as an electrode material of electrochemical capacitors with higher capacitances.

The invention claimed is:

1. A ruthenium oxide encapsulating nano-carbon composite structure, produced by a method comprising the steps of:
   preparing a dispersed solution by highly dispersing in water a hollow nano-carbon having a hollow structure with a porosity of no less than 30% by volume, by centrifugal processing;
   preparing a precursor by adding a ruthenium chloride aqueous solution and adsorbing ruthenium chloride nano-particles onto the inner and outer surface of the hollow nano-carbon; and
   forming ruthenium oxide nano-particles from the ruthenium chloride nano-particles by ultra centrifugal processing of a solution comprising the precursor, and a surface sol-gel reaction,
   wherein the resulting ruthenium oxide nano-particles are highly dispersed as nanodots, inside and outside of hollow nano-carbon graphene layers having a porosity of no less than 30% by volume and the nano-particle size of ruthenium oxide is in the range of 0.5 to 2 nm.

2. The ruthenium oxide encapsulating nano-carbon composite structure according to claim 1, wherein the ruthenium oxide is of a hydrous ruthenium oxide having a hydration number of 0.3 to 2.0.

3. The ruthenium oxide encapsulating nano-carbon composite structure according to claim 1, wherein the content of the ruthenium oxide nano-particles is no less than 5% by mass and no more than 95% by mass based on the entire ruthenium oxide encapsulating nano-carbon composite structure.

4. The ruthenium oxide encapsulating nano-carbon composite structure according to claim 1, wherein the specific capacitance of the ruthenium oxide encapsulating nano-carbon composite structure on a weight basis is no less than 100 F/g.

5. The ruthenium oxide encapsulating nano-carbon composite structure according to claim 1, wherein the ultra centrifugal processing is ultra centrifugal processing at 20,000 G to 75,000 G using a centrifugal device.

6. The ruthenium oxide encapsulating nano-carbon composite structure according to claim 5, wherein the ultra centrifugal processing is conducted for 3 minutes to 20 minutes.

* * * * *